(12) United States Patent
Kamiyama et al.

(10) Patent No.: US 7,943,672 B2
(45) Date of Patent: May 17, 2011

(54) FOAMING METHOD AND APPARATUS THEREFOR

(75) Inventors: Motoya Kamiyama, Takatsuki (JP); Kiichi Yamashita, Takatsuki (JP)

(73) Assignee: Sunstar Giken Kabushiki Kaisha, Osaka (JP)

( * ) Notice: Subject to any disclaimer, the term of this patent is extended or adjusted under 35 U.S.C. 154(b) by 873 days.

(21) Appl. No.: 11/883,804

(22) PCT Filed: Feb. 14, 2006

(86) PCT No.: PCT/JP2006/302537
§ 371 (c)(1),
(2), (4) Date: Aug. 7, 2007

(87) PCT Pub. No.: WO2006/085656
PCT Pub. Date: Aug. 17, 2006

(65) Prior Publication Data
US 2009/0163605 A1     Jun. 25, 2009

(30) Foreign Application Priority Data
Feb. 14, 2005   (JP) ................................. 2005-036033

(51) Int. Cl.
*B01F 3/04* (2006.01)
(52) U.S. Cl. .......................................... 516/10; 261/28
(58) Field of Classification Search ............... 516/10; 261/28
See application file for complete search history.

(56) References Cited

U.S. PATENT DOCUMENTS

| 5,984,280 A | 11/1999 | Okuda et al. |
| 6,538,040 B1 | 3/2003 | Okuda et al. |

FOREIGN PATENT DOCUMENTS

| EP | 0 776 745 | 6/1997 |
| EP | 0 974 391 | 12/2004 |
| JP | 06-198152 | * 12/1992 |
| JP | 06-198152 | 7/1994 |
| JP | 09-206638 | 8/1997 |
| JP | 10-272344 | 10/1998 |
| JP | 10-278118 | 10/1998 |

OTHER PUBLICATIONS

Chinese Office Action dated Apr. 3, 2009 in corresponding Chinese patent application No. 2006800048447 together with its English translation.
Japanese Office Action (with English translation) issued Jan. 28, 2011 in corresponding Japanese Patent Application No. 2005-036033.

* cited by examiner

*Primary Examiner* — Ling-Siu Choi
*Assistant Examiner* — Chun-Cheng Wang
(74) *Attorney, Agent, or Firm* — Wenderoth, Lind & Ponack, L.L.P.

(57) ABSTRACT

A gas mixing/supplying device and a method includes of introducing a gas into a high-viscosity material. The method the steps of effecting a first suction stroke in which the piston (25) is moved in the cylinder (27); supplying a high-viscosity material to the cylinder, using a suction force in the cylinder generated in said first suction stroke; stopping the piston after the first suction stroke; effecting a second suction stroke in which the piston is moved in the cylinder after the supply of the high-viscosity material; supplying a gas to the cylinder, using a suction force in the cylinder generated in the second suction stroke; effecting a pressurizing stroke in which the piston is moved in the cylinder after completion of the supply of the gas; and effecting a discharge stroke in which the high-viscosity material and the gas are discharged into a conduit. Then, the high-viscosity material is foamed under atmospheric pressure.

9 Claims, 7 Drawing Sheets

FOAMING METHOD AND APPARATUS THEREFOR

BACKGROUND OF THE INVENTION

1. Technical Field

The present invention relates to a method for foaming a high-viscosity material and an apparatus therefor. Specifically, the present invention relates to a compact and simple apparatus for foaming a high-viscosity material, which is used for forming a foamed-in-place gasket, filling of a void, etc.

2. Description of the Related Art

Figure 5:
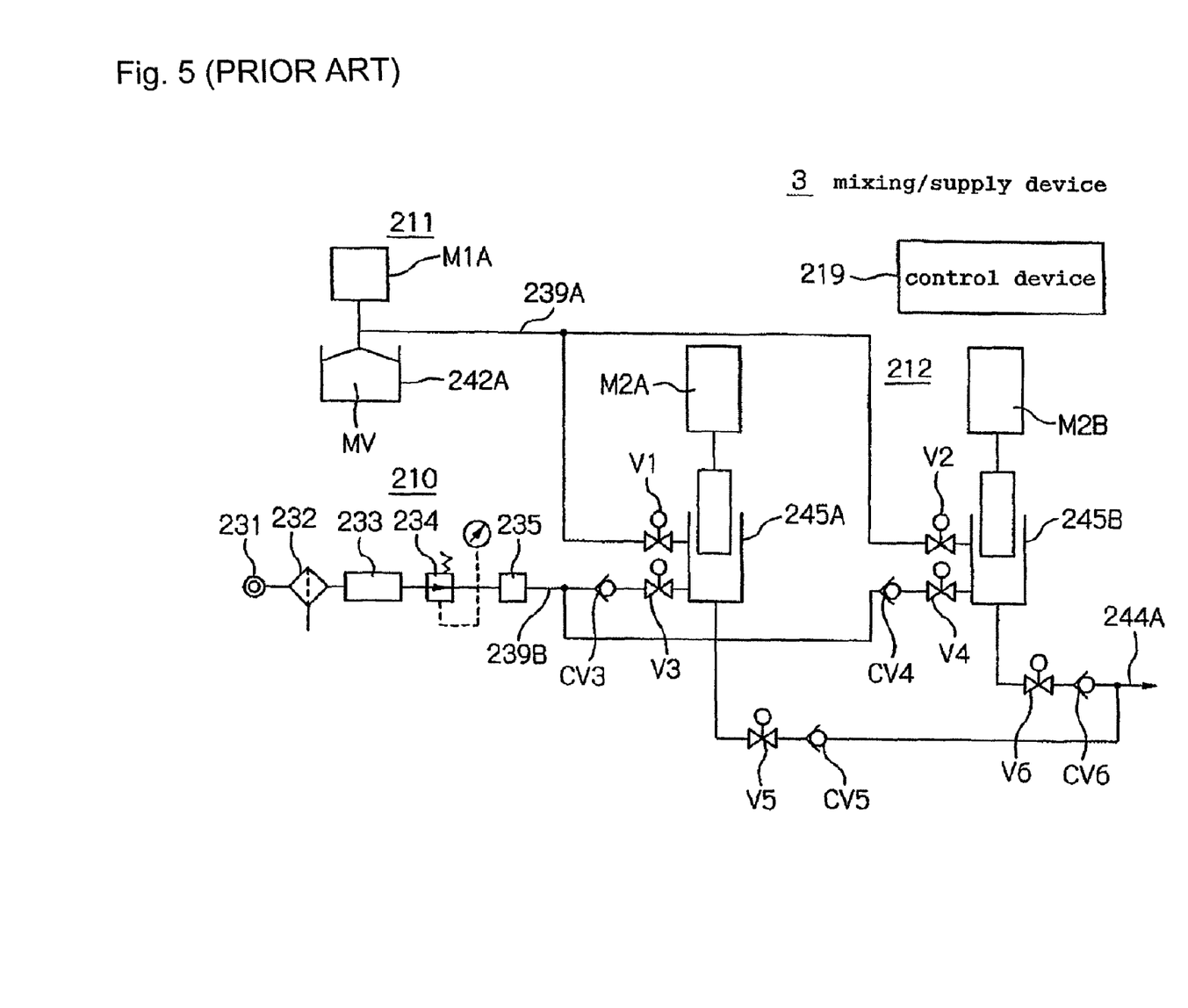
FIG. 5 is a circuit diagram indicating a conventional foaming apparatus.
Figure 6:
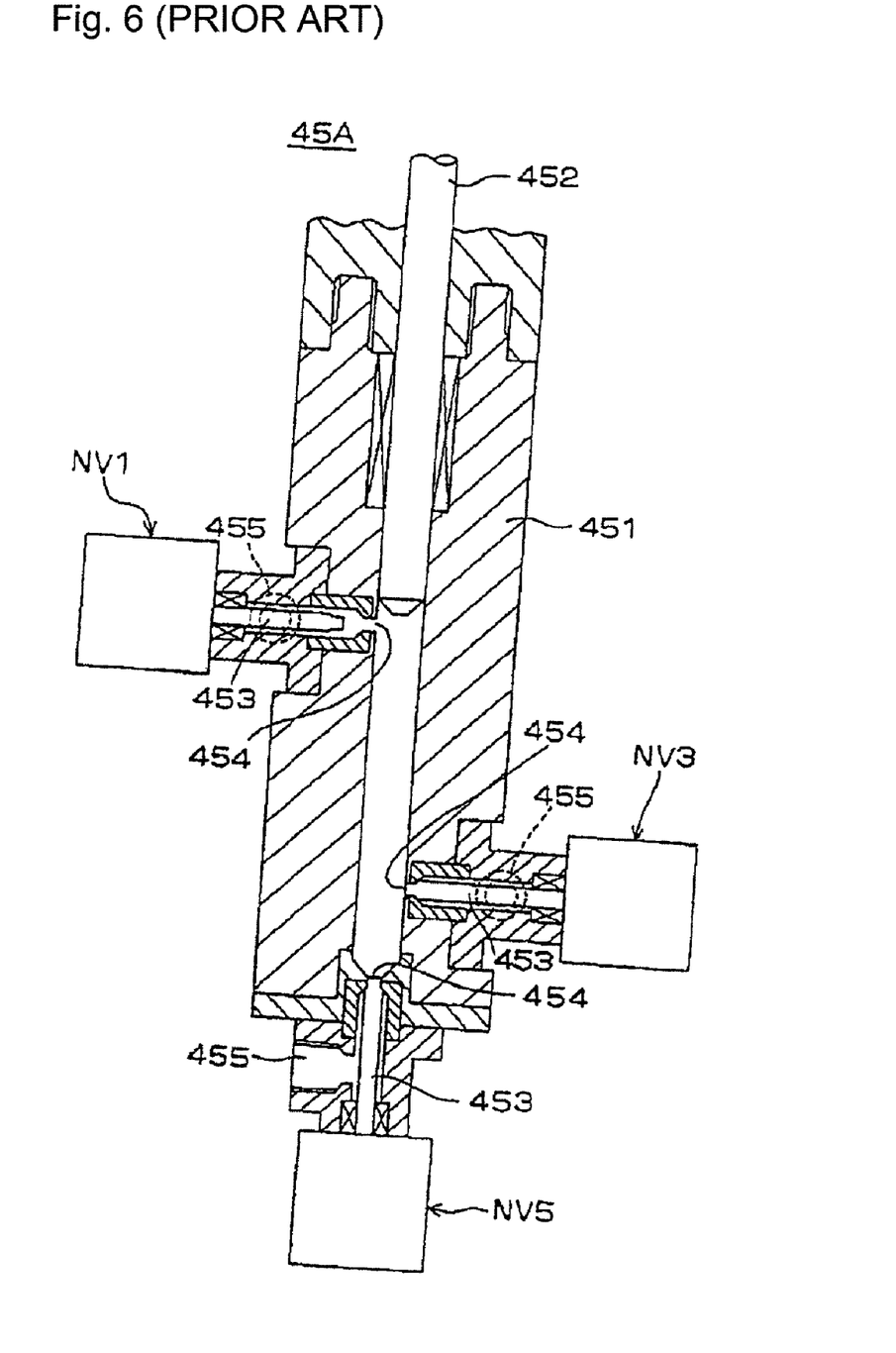
FIG. 6 is a front sectional view indicating a structure of a conventional piston pump.
Figure 7:
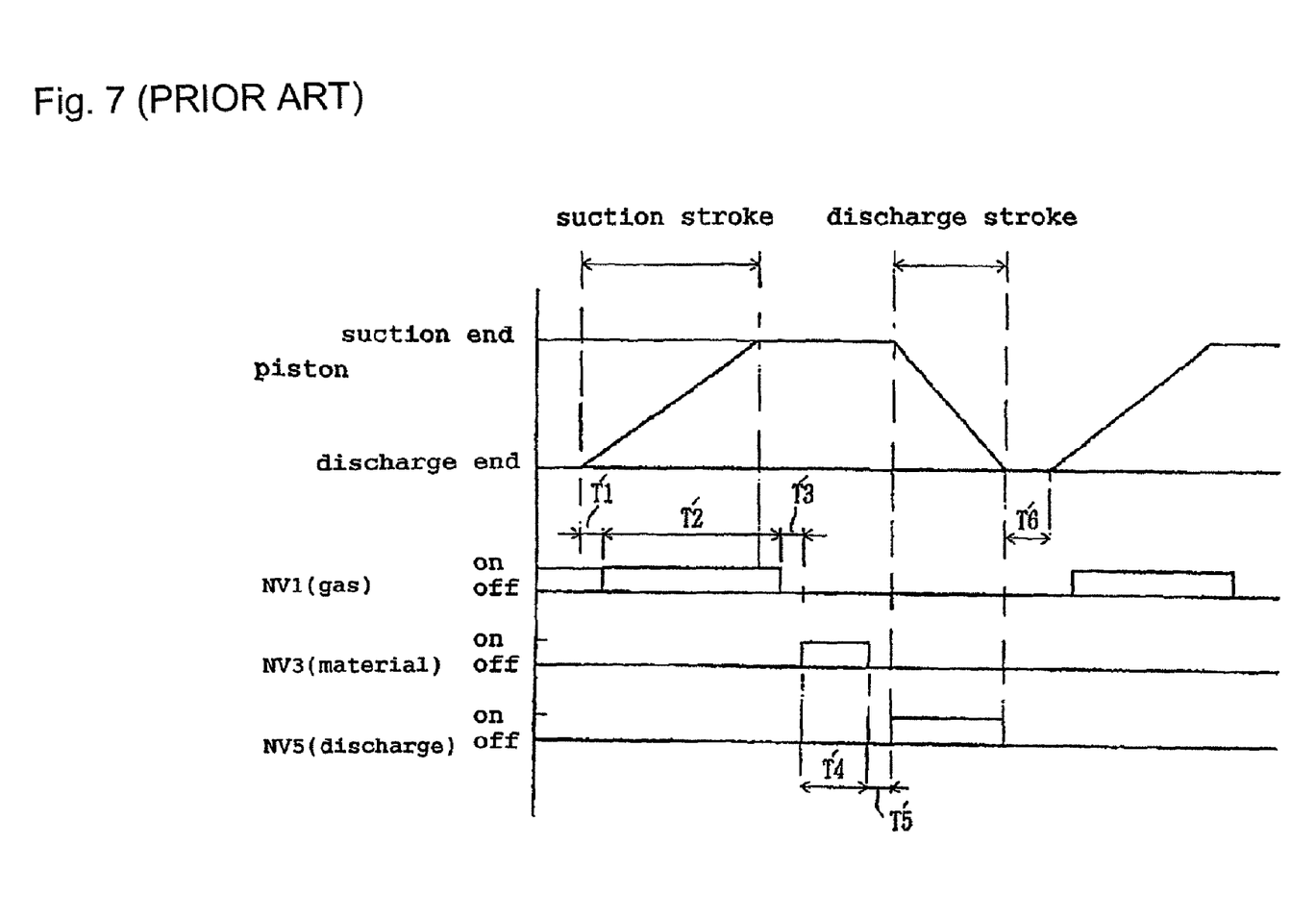
FIG. 7 is a timing chart indicating an operation of a conventional piston pump.

FIG. 5 shows a fluid circuit of a gas mixing/supplying device of a conventional foaming apparatus. In this gas mixing/supplying device, a gas is introduced into a high-viscosity material by means of a piston pump. FIG. 6 is a front cross-sectional view indicating a structure of a piston pump used in conventional techniques. FIG. 7 is a timing chart for explaining an operation of the piston pump.

In FIG. 5, a gas introducing device 212 comprises two piston pumps 245A and 245B which operate in an alternate manner. In each of the piston pumps 245A and 245B, a piston is operated by means of a motor M2A or M2B so as to effect a reciprocal linear movement of the piston. Thus, the piston is reciprocally moved in the cylinder, to thereby effect a suction stroke and a discharge stroke. The piston pumps 245A and 245B are interposed between conduits 239A and 244A. A high-viscosity material MV supplied from a high-viscosity material supply device 211 and a gas supplied from a gas supply device 210 are individually introduced to the piston pumps at a predetermined ratio in a batchwise manner. As shown in FIG. 6, a piston pump 245 comprises a cylinder 451, a piston 452 which fittingly slides in the cylinder 451, and 3 needle valves NV1, NV3 and NV5 provided in the cylinder 451.

As shown in FIG. 7, in either the piston pump 245A or the piston pump 245B, the piston moves from a discharge end to a suction end, thus effecting a suction stroke. During this time, after lapse of time T1' from the start of movement of the piston, the needle valve NV1 is opened, and a gas is supplied to the piston pump. Time T1' is about 1 to 2 seconds. During time T1', an inside of the cylinder is subject to negative pressure.

Soon after the piston reaches the suction end, the needle valve NV1 is closed. Thus, after completion of the suction stroke, the inside of the cylinder 451 is filled with a gas having controlled pressure. After lapse of time T3' after the needle valve NV1 is closed, the needle valve NV3 is opened. Time T3' is about 0.1 to 0.5 second. With this arrangement, the needle valve NV1 and the needle valve NV3 are prevented from being open simultaneously. During time T4' during which the needle valve NV3 is open, by means of a screw pump rotatingly driven by the motor M1A, a high-viscosity material MV from the high-viscosity material supply device 11 is supplied into the cylinder 451. Due to a high pressure of the high-viscosity material, a gas having a predetermined pressure, which has been preliminarily supplied into the cylinder 451, is compressed in a ratio equal to a pressure ratio between the high-viscosity material and the gas. Consequently, a volume of the gas becomes substantially negligible.

After lapse of time T5' after the needle valve NV3 is closed, the needle valve NV5 is opened. The piston 452 moves from the suction end to the discharge end, thus effecting a discharge stroke. Time T5' is about 0.1 to 0.5 second. During the discharge stroke, the needle valves NV1 and NV3 are closed, with forward end portions of the needle valves being flush with an inner circumferential surface of the cylinder 451.

Therefore, no dead space is formed, and the gas and the high-viscosity material filled in the cylinder 451 are completely discharged from an opening 454 of the needle valve NV5. After lapse of time T6' after completion of the discharge stroke, a subsequent suction stroke is started. Time T6' is about 0.1 to 0.5 second.

Patent Document 1: Japanese Patent Public Disclosure No. 09-206638
Patent Document 2: Japanese Patent Public Disclosure No. 10-272344
Patent Document 3: Japanese Patent Public Disclosure No. 10-278118

SUMMARY OF THE INVENTION

In the conventional foaming apparatus described above, the cylinder is already filled with a gas and pressurized before the high-viscosity material is supplied, thus necessitating use of a primary pump having a high-pressure transfer and injection function for supplying a high-viscosity material. Therefore, the foaming apparatus must be provided with a drum or a pail container, and a high-viscosity material must be supplied by means of a primary pump. Consequently, the apparatus as a whole is increased in size, and also in cost.

The present invention provides:

a method for mixing a high-viscosity material with a gas, using a piston pump in which a piston is reciprocally moved in a cylinder to thereby effect suction and discharge, said method comprising:

a step of effecting a first suction stroke in which the piston is moved in the cylinder so as to generate a suction condition in the cylinder;

a step of supplying a high-viscosity material to the cylinder, using a suction force in the cylinder generated in said first suction stroke;

a step of stopping the piston after said first suction stroke;

a step of effecting a second suction stroke in which the piston is moved in the cylinder after the supply of the high-viscosity material;

a step of supplying a gas to the cylinder, using a suction force in the cylinder generated in the second suction stroke;

a step of effecting a pressurizing stroke in which the piston is moved in the cylinder after completion of the supply of the gas, to thereby pressurize the high-viscosity material and the gas; and a step of effecting a discharge stroke in which the piston is moved in the cylinder after the pressurizing stroke, to thereby discharge the high-viscosity material and the gas into a conduit.

The present invention also provides:

an apparatus for mixing a high-viscosity material with a gas and transferring the high-viscosity material mixed with the gas, comprising:

a piston pump including a cylinder and a piston provided in the cylinder so as to be reciprocally movable therein, the piston being adapted to be moved in the cylinder in a forward direction to thereby effect a suction stroke, and moved in the cylinder in a reverse direction to thereby effect a discharge stroke;

a high-viscosity material supply device for supplying a high-viscosity material to the cylinder;

a gas supply device for supplying a gas to the cylinder;

a piston drive device for driving the piston of the piston pump;

a piston stopping device for stopping the piston;

a valve device for a high-viscosity material for selectively opening and closing a passage for communication between the high-viscosity material supply device and the cylinder of the piston pump;

a valve device for a gas for selectively opening and closing a passage for communication between the gas supply device and the cylinder of the piston pump;

a first suction stroke controlling portion for generating a first suction condition in the cylinder by moving the piston in the forward direction by means of the piston drive device, and applying an opening command signal to the valve device for the high-viscosity material for a predetermined time, to thereby supply the high-viscosity material from the high-viscosity material supply device to the cylinder due to said first suction force;

a portion for controlling the piston stopping device for stopping the piston by means of the piston stopping device after the first suction condition is generated, and closing the valve device for the high-viscosity material;

a second suction stroke controlling portion for generating a second suction condition in the cylinder by further moving the piston in the forward direction by means of the piston drive device, with the high-viscosity material having been supplied to the cylinder, and applying an opening command signal to the valve device for the gas supply device for a predetermined time, to thereby supply the gas from the gas supply device to the cylinder due to the second suction force; and a pressurizing stroke controlling portion for moving the piston in the reverse direction by means of the piston drive device, to thereby pressurize the high-viscosity material and the gas in the cylinder; and a discharge stroke controlling portion for moving the piston in the reverse direction by means of the piston drive device, to thereby transfer the high-viscosity material and the gas in the cylinder to a conduit communicated with the piston pump.

The present invention further provides:

an apparatus for foaming a high-viscosity material, comprising:

a gas mixing/supply device for introducing a gas into a high-viscosity material; and a pre-mixer for dispersing the gas in the high-viscosity material, the high-viscosity material having the gas mixed therewith being supplied from the mixing/supply device, the high-viscosity material having the gas dispersed therein being adapted to be discharged and foamed under atmospheric pressure.

The present invention further provides:

an apparatus for foaming a high-viscosity material, comprising:

a gas mixing/supply device for introducing a gas into a high-viscosity material; and a discharge device for pressurizing and discharging the high-viscosity material having the gas dispersed therein for foaming, wherein:

using a piston pump in which a piston is reciprocally moved in a cylinder to thereby effect a suction stroke and a discharge stroke, said gas mixing/supply device supplies a high-viscosity material to the cylinder in a suction stroke or after stopping of the suction stroke of the piston pump; effects a second suction stroke by moving the piston after the supply of the high-viscosity material; and supplies a gas to the cylinder in the second suction stroke or after stopping the suction stroke, followed by effecting, after completion of the supply of the gas, a discharge stroke of the piston pump in which:

the high-viscosity material and the gas in the cylinder are pressurized;

the high-viscosity material and the gas are discharged into a conduit after pressurization in the discharge stroke, thus discharging a mixture of the high-viscosity material and the gas dispersed therein and effecting foaming under atmospheric pressure.

According to the present invention, a suction condition is formed in the cylinder, and a high-viscosity material is supplied into the cylinder using a simple means of pressurization or extruding force, in addition to a suction force. Therefore, without using a large delivery pump for supplying a high-viscosity material, a high-viscosity material is directly supplied, by means of pressurization or extrusion, from a small and simple tubular container such as a cartridge, or a flexible bag-type container. Thus, an apparatus as a whole can be reduced in size and cost.

A pump may be added so as to supply a high-viscosity material to the cylinder. A high-viscosity material can be injected into the cylinder under relatively low pressure. Therefore, as a high-viscosity material supply device, an extrusion type device is employed, so as to apply a pressure or an extruding force to a cartridge container or a flexible bag type container.

EXPLANATION OF REFERENCE MARKS 1 foaming apparatus
3 mixing/supply device
5 gas supply device
11 source of air
13 piston drive device
15 controller
17 control device
19 electromagnetic directional control valve device
21 electromagnetic directional control valve
23 piston pump
25 piston
27 cylinder
29 cartridge
31 piston stopping device
33 valve device for a high-viscosity material
35 valve device for a gas
37 piston portion
39 shaft portion
41 chamber
43 control chamber
45 check valve
47 check valve
49 material suction valve 51 gas suction valve
53 material discharge valve
55 gas suction valve controlling valve
57 material suction valve controlling valve
59 material discharge valve controlling valve
61 piston release control valve
63 coating gun control valve
65 pressure sensor
67 coating gun
HV1 valve
HV2 valve
REG2 pressure control valve
REG3 pressure control valve
REG4 pressure control valve

DETAILED DESCRIPTION OF THE INVENTION

Figure 1:
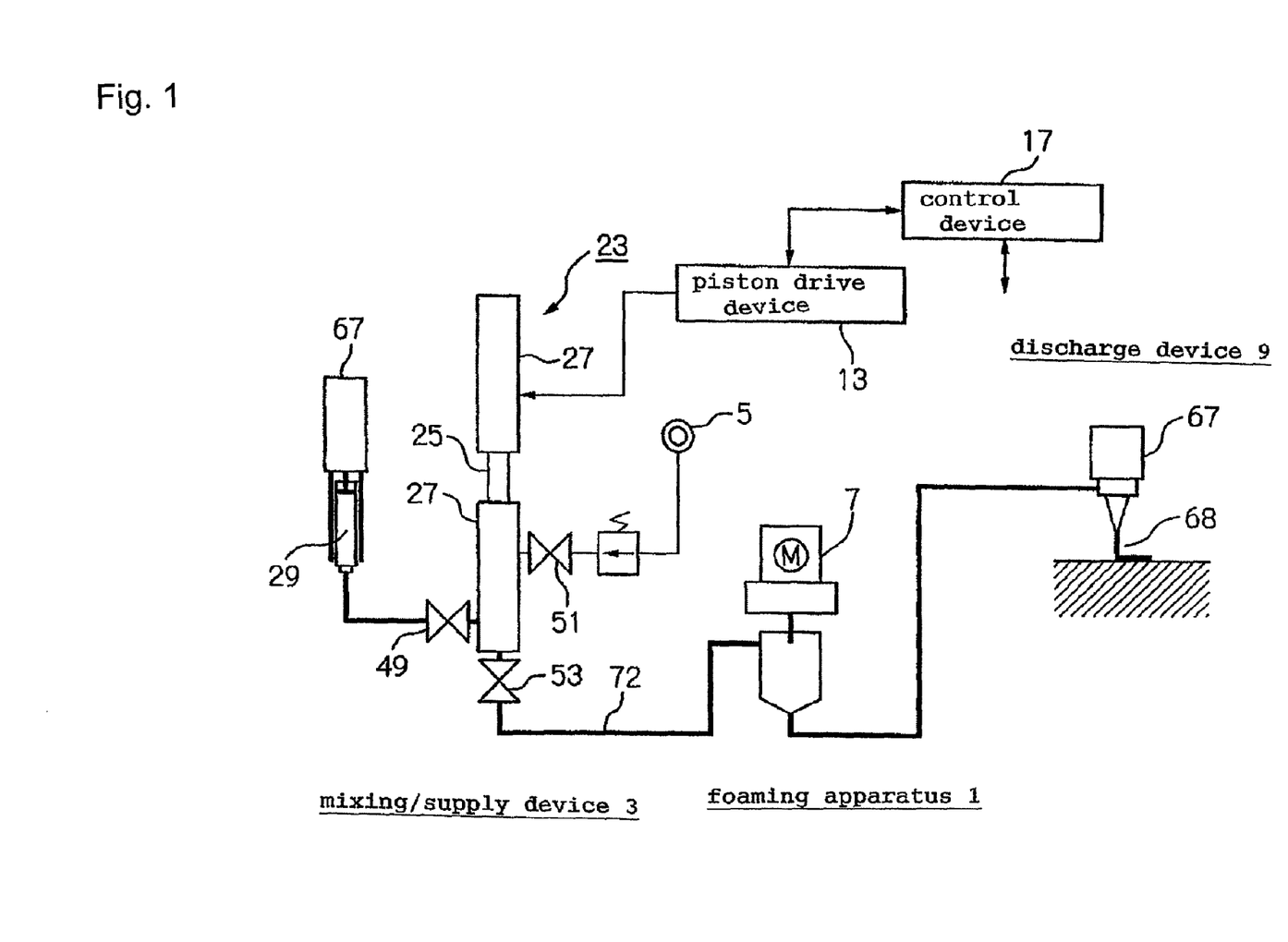
FIG. 1 is a circuit diagram indicating a main part of a foaming apparatus 1 for a high-viscosity material.
Figure 2:
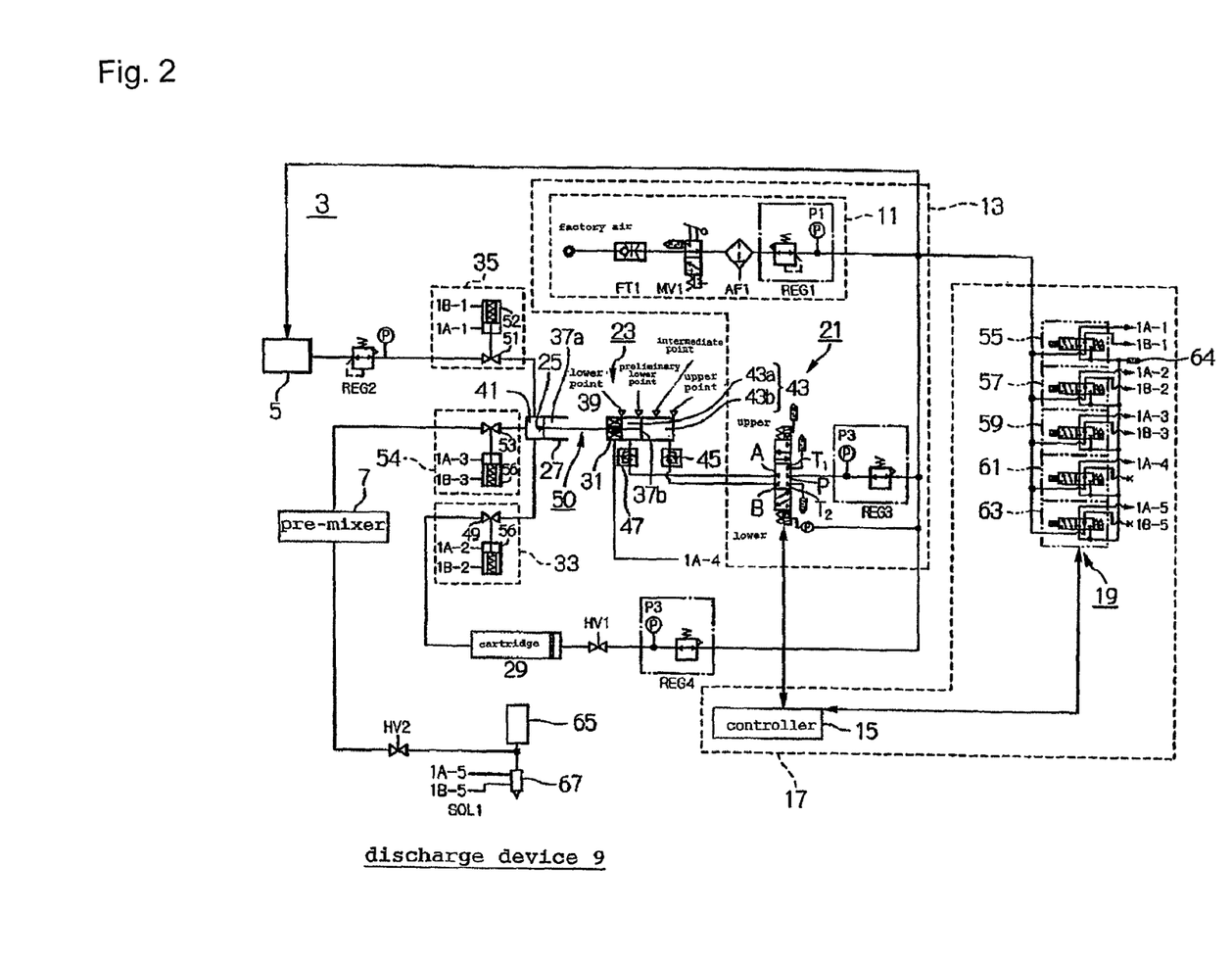
FIG. 2 is a circuit diagram indicating a detail of the foaming apparatus 1.
Figure 3:
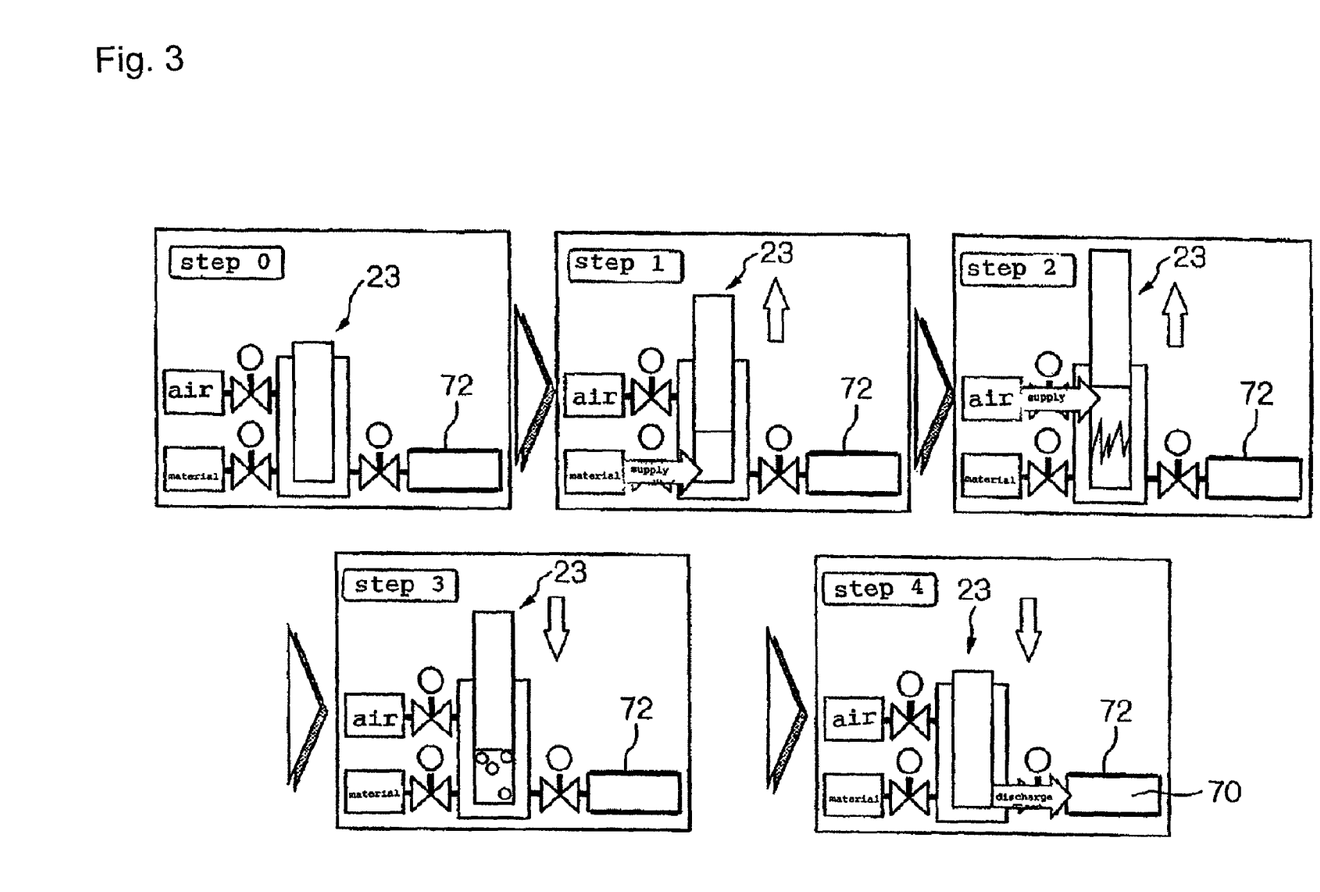
FIG. 3 is a diagram indicating an operation of a piston pump.
Figure 4:
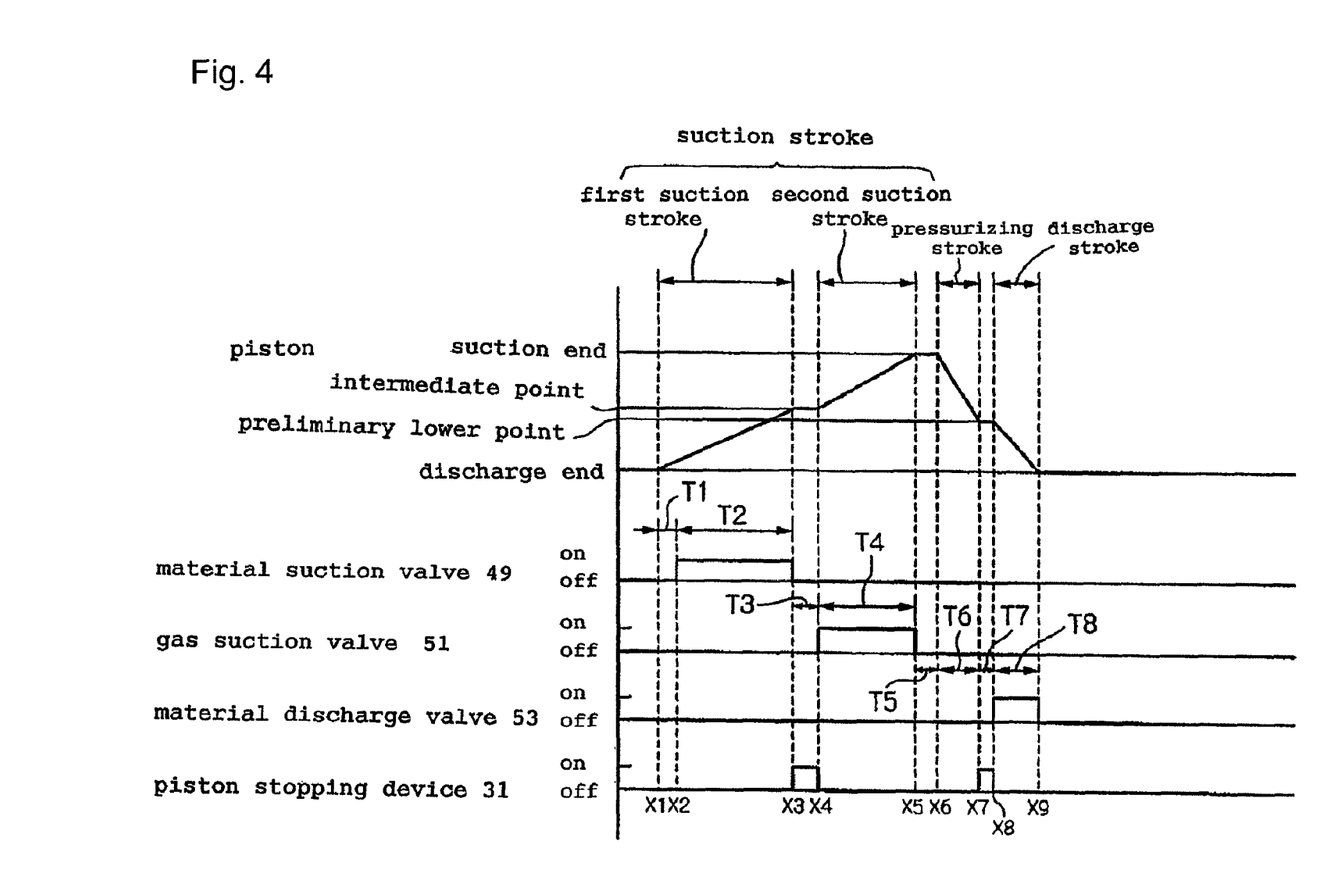
FIG. 4 is a timing chart explaining an operation of the piston pump.

FIG. 1 is a circuit diagram indicating a main part of a foaming apparatus 1 for a high-viscosity material. FIG. 2 is a circuit diagram indicating a detail of the foaming apparatus 1. FIG. 3 is a diagram indicating an operation of a piston pump 23. FIG. 4 is a timing chart explaining the operation of the piston pump 23.

Referring to FIGS. 1 and 2, the foaming apparatus 1 comprises a mixing/supply device 3 for introducing a gas into a high-viscosity material, a pre-mixer 7 for dispersing a gas in a high-viscosity material, the high-viscosity material having the gas mixed therewith being supplied from the mixing/supply device 3, and a discharge device 9 for pressurizing the mixture having the gas dispersed therein and effecting foaming.

The mixing/supply device 3 is used for mixing a gas into a high-viscosity material and transferring the high-viscosity material mixed with the gas.

As shown in FIG. 2, the mixing/supply device 3 comprises a piston pump 23 having a cylinder 27 and a piston 25 reciprocally provided in the cylinder 27, a cartridge 29 as a high-viscosity material supply device for supplying a high-viscosity material to the cylinder 27, a gas supply device 5 for supplying a gas to the cylinder 27, a piston drive device 13 for driving the piston 25 of the piston pump 23, a piston stopping device 31 for stopping the piston 25 by applying a restraining force to the piston 25, a valve device 33 for a high-viscosity material, which opens or closes a passage for communication between the cartridge 29 and the cylinder 27 of the piston pump 23, a valve device 35 for a gas, which opens or closes a passage for communication between the gas supply device 5 and the cylinder 27 of the piston pump 23, and a control device 17.

The control device 17 controls the piston drive device 13, the valve device 33 for a high-viscosity material, the valve device 35 for a gas of the gas supply device, and the piston stopping device 31. Thus, during a suction stroke of the piston pump 23 or after the end of the suction stroke of the piston pump 23, a high-viscosity material is supplied to the cylinder 27, utilizing a suction force (a vacuum force) generated in the cylinder 27, and after the high-viscosity material is introduced to the cylinder in a predetermined amount, the piston 25 is moved to thereby effect a second suction stroke. During the second suction stroke or after the end of the suction stroke, a gas is supplied to the cylinder 27, utilizing a suction force (a vacuum force) generated in the cylinder 27, and after the completion of the supply of the gas, a discharge stroke of the piston pump 23 is effected for pressurization, and the high-viscosity material and the gas are discharged into a conduit.

The piston pump 23 effects a suction stroke according to the movement of the piston 25 in a forward direction in the cylinder 27, and effects a discharge stroke by movement of the piston 25 in a reverse direction in the cylinder 27. The piston 25 comprises a pair of piston portions 37 slidably disposed in the cylinder 27 in a liquid-tight and gas-tight manner, and a shaft portion 39 connecting the pair of piston portions 37. One piston portion 37a and the shaft portion 39 define a chamber 41 in a left-side portion (as viewed in the drawing) of the cylinder 27 of the piston pump 23, to which chamber a high-viscosity material and a gas are supplied. The other piston portion 37b defines, in a right-side portion (as viewed in the drawing) of the cylinder of the piston pump, a pair of control chambers 43a and 43b of the piston drive device for effecting reciprocal movement of the piston. It should be noted that the piston pump 23 may have the same structure as a conventional piston pump such as that shown in FIG. 6.

The cartridge 29 for supplying a high-viscosity material has a supply opening at one end thereof. The supply opening is connected to the chamber 41 through a conduit. In this embodiment, a high-viscosity material in the cartridge 29 is supplied to the chamber 41 by pressurization and extrusion in addition to a suction force generated in the chamber 41 formed in the cylinder 27 of the piston pump 23. Therefore, it is unnecessary to apply a high pressure for transferring a high-viscosity material to the cartridge 29. Therefore, as the cartridge 29, a lightweight and inexpensive cartridge having low pressure resistance can be used. In this embodiment, to enable a high-viscosity material stored in the cartridge 29 to be smoothly supplied to the chamber 41, the other end of the cartridge 29 is connected to an air source 11, as a source of pressure, through a valve HV1 and a pressure control valve REG4. With this arrangement, even a material having an extremely high viscosity can be employed as a high-viscosity material. However, if air from the air source 11 is used, the pressure of air supplied from the air source 11 to the cartridge 29 is not required to be high, since a suction force of the chamber 41 is utilized for supplying the high-viscosity material. Therefore, it is unnecessary to form the cartridge 29 from a tough member having high pressure resistance, which is increased in size and weight. When a material having a relatively low viscosity is employed as a high-viscosity material, it is unnecessary to utilize a pressure or an extruding force from the air source 11. In this case, a high-viscosity material may be supplied to the cylinder 27 utilizing only a suction force generated in the chamber 41 in the cylinder 27 in a suction stroke of the piston pump 23.

The piston drive device 13 moves the piston 25 of the piston pump 23 in a forward direction and a reverse direction, in response to a command signal from the piston control device 17, and comprises the air source 11, and an electromagnetic directional control valve 21 provided between the air source 11 and the piston pump 23. The electromagnetic directional control valve 21 is connected to one of the control chambers 43 of the piston pump 23 through a conduit, and the other control chamber 43 of the piston pump 23 through another conduit, thus communicating the pair of control chambers 43 with the air source 11 in an alternate manner. With this arrangement, air from the air source 11 is supplied to the pair of control chambers 43 in an alternate manner, to thereby effect reciprocal movement of the piston 25. A check valve 45 and a check valve 47 are provided in conduits connecting the electromagnetic directional control valve 21 and the piston pump 23, respectively. A pressure control valve REG 3 is provided between the electromagnetic directional control valve 21 and the air source 11. With this arrangement, air is stably supplied to the pair of control chambers 43.

The gas supply device 5 (such as a compressor) for storing a gas (such as dry air) is connected to the chamber 41 formed in the cylinder 27 of the piston pump 23 through a conduit. A pressure control valve REG 2 is provided between the gas supply device 5 and the piston pump 23, thus enabling dry air to be supplied in a stable condition. In this embodiment, the gas supply device 5 utilizes air from the air source 11, and includes a dehumidifying filter for removing moisture from the air.

The piston stopping device 31 is capable of applying a restraining force to the piston 25 at a desired position, in response to a command signal from the control device 17 of a control portion of the piston stopping device, to thereby stop the piston 25. The piston stopping device 31 has an annular configuration, such as a shape of a bladder, having a through portion at the center thereof. By transferring a gas into the piston stopping device 31, the piston stopping device 31 expands to the central through portion to thereby reduce the diameter of the through portion. When the gas is released, the piston stopping device 31 returns to its original shape due to its elastic properties. Such a piston stopping device is well known, and therefore a detail of an arrangement of the piston stopping device is omitted in the drawings. The piston stopping device 31 is fixed in the cylinder in a manner such that the through portion is aligned with the direction of movement of the piston, and the piston stopping device 31 and one piston portion 37b form one control chamber 43a. The shaft portion 39 of the piston 25 extends through the through portion of the piston stopping device 31. A seal structure (not shown) is provided between the shaft portion 39 and the through portion, to thereby prevent air transferred to the control chamber 43a adjacent to the piston stopping device 31 from leaking through a space between the shaft portion 39 and the through portion. A peripheral portion forming the through portion of the piston stopping device 31 expands to the through portion in response to a command signal from the control device 17, to thereby narrow (reduce the diameter of) the through portion. Thus, the peripheral portion of the piston stopping device 31 is pressed against the shaft portion 39 of the piston 25, to thereby lock the piston 25 at a desired position. Consequently, by locking the piston 25 at a desired position in a suction stroke, a high-viscosity material can be supplied to the chamber 41 in a desired amount. That is, by locking the piston 25 at a desired position, the amount of a high-viscosity material supplied to the chamber 41 can be measured. Further, in a discharge stroke, by locking the piston 25 at a desired position while a discharge opening of the piston pump 23 is closed, a high-viscosity material having a gas mixed therewith in the chamber 41 can be pressurized to a desired pressure value, and can be maintained at the same pressure value. In addition, the peripheral portion forming the through portion of the piston stopping device 31 is diametrically enlarged so as to increase the diameter of the through portion, in response to a command signal from the control device 17. Consequently, the peripheral portion of the piston stopping device 31 is separated from the shaft portion 39 of the piston 25, to thereby release the locked condition of the piston 25.

The valve device 33 for a high-viscosity material comprises a material suction valve 49, and a drive portion 50 for driving the material suction valve 49 in response to a command signal from the control device 17. The material suction valve 49 is provided in a conduit (as a passage) for communication between the cartridge 29 and the chamber 41 formed in the cylinder 27 of the piston pump 23. In a first suction stroke, when the chamber 41 has been placed in a sufficient suction condition, the material suction valve 49 opens the conduit in response to a command signal from the control device 17, to thereby supply a high-viscosity material in the cartridge 29 to the chamber 41, utilizing a suction force generated in the chamber 41. The material suction valve 49 may be opened in the middle of the first suction stroke, or simultaneously with the first suction stroke. Otherwise, the material suction valve 49 may be opened immediately after the end of the first suction stroke, or with a time lag after the end of the first suction stroke.

The valve device 35 for a gas comprises a gas suction valve 51, and a drive portion 52 for driving the gas suction valve 51 in response to a command signal from the control device 17. The gas suction valve 51 is provided in a conduit (as a passage) for communication between the gas supply device 5 and the cylinder 27 of the piston pump 23. In a second suction stroke, when the chamber 41 in the cylinder 27 of the piston pump 23 has been placed in a sufficient suction condition, the gas suction valve 51 opens the conduit in response to a command signal from the control device 17, to thereby supply a gas in the gas supply device 5 to the chamber 41, utilizing a suction force of the chamber 41. The gas suction valve 51 may be opened in the middle of the second suction stroke. Otherwise, the gas suction valve 51 may be opened immediately after the end of the second suction stroke, or with a time lag after the end of the second suction stroke.

The control device 17 comprises a first suction stroke control portion, a piston stopping control portion, a second suction stroke control portion and a discharge stroke control portion. The first suction stroke control portion controls the piston drive device 13, to thereby move the piston 25 in a forward direction to thereby generate a first suction condition in the chamber 41 of the cylinder 27, and supplies an opening command signal to the material suction valve 49 for a predetermined time period, to thereby supply a high-viscosity material in the cartridge 29 to the chamber 41 of the cylinder 27 under a first suction force. The piston stopping control portion controls the piston stopping device 31, to thereby apply a restraining force to the piston 25 after generation of the first suction condition, to thereby stop the piston 25. The second suction stroke control portion supplies a command signal for release of the piston to the piston stopping control portion, and controls the piston drive device 31, to thereby move the piston 25 further in the forward direction to generate a second suction condition in the chamber 41 of the cylinder 27, with the high-viscosity material having been supplied to the chamber 41 of the cylinder 27. The second suction stroke control portion then supplies an opening command signal to the gas suction valve 51 for a predetermined time period, to thereby supply a gas in the gas supply device 5 to the chamber 41 of the cylinder 27 under a second suction force. The discharge stroke control portion controls the piston drive device 13, to thereby move the piston 25 in the reverse direction and supply the high-viscosity material and the gas in the cylinder 27 to a conduit communicated with the piston pump 23. In this embodiment, the control device 17 comprises a controller 15 and an electromagnetic directional control valve device 19. The controller 15 and the electromagnetic directional control valve device 19 provide the first suction stroke control portion, the piston stopping control portion, the second suction stroke control portion and the discharge stroke control portion.

In this embodiment, a discharge valve device 54 is provided in the discharge opening of the piston pump 23, so as to open or close the discharge opening in response to a command signal from the control device 17. The discharge valve device 54 comprises a material discharge valve 53, and a drive portion 56 for driving the material discharge valve 53 in response to a command signal from the control device 17. As long as the material discharge valve 53 is closed, the high-viscosity material and the gas in the chamber 41 of the piston pump 23 are prevented from being discharged towards the pre-mixer 7 even in a discharge stroke of the piston pump 23. By means of the discharge valve device 54, it is possible to close the discharge opening of the piston pump 23 in a discharge stroke, and to pressurize a high-viscosity material having a gas mixed therewith in the chamber 41 to a desired pressure value until the piston 25 is locked in a desired position (for example, a preliminary lower point described later) and maintain the piston 25 at the same pressure value. This pressurization is carried out so as to preliminarily compress a gas before a subsequent step, because a gas can be easily compressed under pressure. By compressing a gas, the high-viscosity material and the gas discontinuously supplied to the cylinder in a batchwise manner are almost combined with each other in the form of a mixture. Therefore, after compression of the gas, when the material discharge valve 53 opens in response to a command signal from the control device 17, a high-viscosity material having a gas mixed therewith can be continuously transferred to the pre-mixer 7 under high pressure.

The electromagnetic directional control valve 21 of the piston drive device 13 comprises a 5-port, 3-position switching valve. Specifically, the electromagnetic directional control valve 21 comprises 5 ports such as an A-port, a B-port, a T1-port, a P-port and a T2-port, and 3 switch positions such as an upper-stage portion, an intermediate-stage portion and a lower-stage portion. The A-port is connected to the control chamber 43a through the check valve 47. The B-port is connected to the control chamber 43b through the check valve 45. The T1-port and the T2-port are open to the atmosphere through relief valves, respectively. The P-port is connected to the air source 11. Normally, as shown in FIG. 2, the intermediate-stage portion is interposed between the piston pump 23 and the air source 11, so as to prevent air from being supplied from the air source 11. To effect a suction stroke of the piston pump 23, the A-port and the P-port are communicated with each other and the B-port and the T2-port are communicated with each other, through the upper-stage portion of the electromagnetic directional control valve 21. Thus, air from the air source 11 is transferred to the control chamber 43a through the P-port and the A-port, and air in the control chamber 43b is released to the atmosphere through the B-port and the T2-port. To effect a discharge stroke of the piston pump 23, the A-port and the T1-port are communicated with each other and the B-port and the P-port are communicated with each other, through the lower-stage portion of the electromagnetic directional control valve 21. Thus, air from the air source 11 is transferred to the control chamber 43b through the P-port and the B-port, and air in the control chamber 43a is released to the atmosphere through the A-port and the T1-port.

In a suction stroke of the piston pump 23, the piston stopping device 31 applies a restraining force to the piston 25 to thereby stop the piston 25, so as to lock the piston portion 37b on a side of the control chamber 43 at a predetermined position (a first suction stroke). In this instance, utilizing a suction force generated in the chamber 41, a high-viscosity material is sucked into the chamber 41. Thereafter, the piston stopping device 31 releases the restraining force, so that the piston portion 37b on a side of the control chamber 43 moves to an upper point shown in FIG. 2 and abuts against an inner wall surface of the cylinder 27 on the right side in FIG. 2, thus preventing the piston from moving (a second suction stroke). In this instance, utilizing a suction force generated in the chamber 41, a gas is sucked into the chamber 41.

To lock the piston portion 37 on a side of the control chamber 43 at a predetermined position, the piston 25 may be locked only by means of a restraining force of the piston stopping device 31. However, the electromagnetic directional control valve 21 may be controlled simultaneously with the operation of the piston stopping device 31 so as to enable the intermediate-stage portion to be interposed between the piston pump 23 and the air source 11 and prevent air from being supplied from the air source 11 to the control chamber 43. On the other hand, in a discharge stroke of the piston pump 23, the piston stopping device 31 stops the piston 25 by applying a restraining force to the piston 25, so as to lock the piston portion 37 at a preliminary lower point shown in FIG. 2 (a pressurizing step). In this instance also, the piston 25 may be locked only by means of a restraining force of the piston stopping device 31. However, the electromagnetic directional control valve 21 may be controlled simultaneously with the operation of the piston stopping device 31 so as to prevent air from being supplied from the air source 11 to the control chamber 43. The piston stopping device 31 is controlled by means of the piston drive device 13. In this embodiment, even in a discharge stroke of the piston pump 23, the piston portion 37 is locked at a preliminary lower point before the material discharge valve 53 opens. Therefore, a high-viscosity material having a gas mixed therewith in the chamber 41 can be pressurized to a desired pressure value until the preliminary lower point, and can be maintained at the same pressure value. Thus, when the material discharge valve 53 is opened, the high-viscosity material having the gas mixed therewith can be transferred under high pressure.

A mixing ratio at which a high-viscosity material is mixed with a gas can be controlled, based on a pressure of the gas supplied from the gas supply device. The pressure of the gas from the gas supply device is controlled by the control device. The mixing ratio may be controlled by changing a position at which the piston is stopped by means of the piston stopping device of the piston pump. The piston stopping device can be controlled by means of the piston drive device. It is preferred that the piston drive device is capable of serving as the piston stopping device, and an arbitrary foaming ratio can be obtained.

The electromagnetic directional control valve device 19 of the control device 17 comprises a gas suction valve controlling valve 55, a material suction valve controlling valve 57, a material discharge valve controlling valve 59, a piston release control valve 61 and a coating gun control valve 63. These valves form an integral unit structure. In this embodiment, the coating gun control valve 63 is provided in the electromagnetic directional control valve device 19, so as to reduce an overall size of the apparatus. However, the coating gun control valve 63 may not necessarily be provided in the electromagnetic directional control valve device 19, and may be provided separately from the electromagnetic directional control valve device 19. Each of the gas suction valve controlling valve 55, the material suction valve controlling valve 57, the material discharge valve controlling valve 59, the piston release control valve 61 and the coating gun control valve 63 comprises a 5-port positional switching valve.

Regarding the gas suction valve controlling valve 55, a right-side stage block is normally interposed between the air source 11 and the gas suction valve 51. In this state, air from the air source 11 is transferred to a 1B-1 chamber of the gas suction valve controlling valve 55, while air from a 1A-1 chamber of the gas suction valve controlling valve is released through the right-side stage block and a relief valve 64 to the atmosphere. Therefore, the gas suction valve 51 is in a closed condition. In response to a command signal from the controller 15, the gas suction valve controlling valve 55 moves so that a left-side stage block is interposed between the air source 11 and the gas suction valve 51. In this case, contrary to the above, air from the air source 11 is transferred to the 1A-1 chamber of the gas suction valve controlling valve 55, and air from the 1B-1 chamber of the gas suction valve controlling valve 55 is released through the left-side stage block and the relief valve 64. Consequently, the gas suction valve 51 moves from a closed position to an open position.

The material suction valve controlling valve 57 has a structure similar to the gas suction valve controlling valve 55. Normally, a right-side stage block of the material suction valve controlling valve 57 is interposed between the air source 11 and the material suction valve 49, to thereby place the material suction valve 49 in a closed condition. In response to a command signal from the controller 15, a left-side stage block of the material suction valve controlling valve 57 moves so as to be interposed between the air source 11 and the material suction valve 49. Consequently, the material suction valve 49 moves from a closed position to an open position.

Each of the material discharge valve controlling valve 59, the piston release control valve 61 and the coating gun control valve 63 has a structure similar to the gas suction valve controlling valve 55. Normally, a right-side stage block is located between the air source 11 and the corresponding valve, to thereby place the valve in a closed condition. In response to a command signal from the controller 15, a left-side stage block moves so as to be interposed between the air source 11 and the corresponding valve, which thus moves from a closed position to an open position.

Regarding the pre-mixer 7, rotation of the mixer is controlled by means of a motor, to thereby disperse a gas in a high-viscosity material. It is preferred that the pre-mixer 7 be compact in size and have a structure which allows an easy overhaul. The pre-mixer 7 is used if desired, when fine, uniform closed foaming cells are required to be obtained.

The discharge device 9 comprises a valve HV2, a pressure sensor 65 and a coating gun 67. The coating gun 67 is controlled by means of the controller 15 of the control device 17 through the coating gun control valve 63 of the electromagnetic directional control valve 19. Information of the pressure sensor 65 is output to the controller 15, and based on the information of the pressure sensor 65, the controller 15 controls the valve HV2 and the coating gun control valve 63. With this arrangement, the coating gun 67 discharges a mixture having a gas compressed and finely dispersed therein under desired pressure with predetermined timing. When the mixture in a compressed state is released and subject to atmospheric pressure, the gas in the high-viscosity material expands, to thereby obtain a foam of the high-viscosity material. For example, as shown in FIG. 1, the coating gun 67 is used for forming string-like foaming beads 68 on an object 66.

Referring to FIGS. 2, 3 and 4, description is made with regard to an operation of the mixing/supply device 3.

First, at an initial value, the piston portion 37b is located at the lower point, and the piston portion 37a is in contact with an inner wall end portion of the cylinder 27 on the left side in FIG. 2, so that the capacity or volume of the chamber 41 formed in the cylinder 27 is zero. At this initial value, the intermediate-stage portion of the electromagnetic directional control valve 21 is interposed between the piston pump 23 and the air source of air 11. Therefore, there is no communication between the A- and B-ports and the T1-, P- and T2-ports, and no air is supplied from the air source 11 to the control chambers 43a and 43b. This is the condition of step 0 indicated in FIG. 3 (see X1 in FIG. 4).

Subsequently, the controller 15 of the control device 17 controls the electromagnetic directional control valve 21, to thereby allow communication between the A-port and the P-port, and between the B-port and the T2-port, through the upper-stage portion of the electromagnetic directional control valve 21. Thus, air is supplied from the air source 11 to the control chamber 43a through the P-port and the A-port, while air in the control chamber 43b is released to the atmosphere through the B-port and the T2-port. Consequently, the piston 25 moves in a direction so as to increase a capacity of the chamber 41 of the cylinder 27, to thereby generate a suction force in the chamber 41 (a first suction stroke).

After time T1 from the start of movement of the piston pump 23, the controller 15 controls the material suction valve controlling valve 57, to thereby open the material suction valve 49 (see X2 in FIG. 4), and, after time T2 in FIG. 4, closes the material suction valve 49 (see X3 in FIG. 4). During time T2, a high-viscosity material is supplied from the cartridge 29 to the chamber 41 due to the suction force of the chamber 41 (the first suction stroke). In this instance, the pressure of the high-viscosity material is 1 to 10 kg/cm$^2$. Normally, the high-viscosity material is supplied at 2 kg/cm$^2$. This is the condition of step 1 in FIG. 3.

When the piston portion 37b of the piston 25 moves to the intermediate point, the controller 15 controls the material suction valve controlling valve 57, to thereby close the material suction valve 49. At the same time, the controller 15 controls the piston release controlling valve 61 to thereby operate the piston stopping device 31, and enable the piston 37 on a side of the control chamber 43 to reliably stop at the intermediate point (see X3 in FIG. 4). In this instance, it is preferred that the electromagnetic directional control valve 21 be controlled to thereby stop the supply of air to the control chamber 43 and stop the movement of the piston 25. Based on time T2 until the piston 25 stops at the intermediate point, and the speed of movement of the piston 25, an amount of the high-viscosity material supplied to the chamber 41 of the cylinder 27 can be automatically measured. A first suction stroke is effected between time X1 and time X3 in FIG. 4.

During the first suction stroke or during time T2, the controller 15 opens the valve HV1, to thereby extrude the high-viscosity material stored in the cartridge 29 by means of pressurized air from the air source 11. Utilizing this extrusion by means of air and the above-mentioned suction force, the high-viscosity material can be supplied to the chamber 41. Thus, in the present embodiment, to supply a high-viscosity material to the chamber 41 of the cylinder 27, a method of extrusion by means of air pressure is utilized, in addition to the suction force. However, supply of a high-viscosity material can be conducted only by means of the suction force of the chamber 41. Alternatively, the suction force may be combined with a method of extrusion such as that of a mechanical type, an electric type, a hydraulic type or a type using an extrusion control cylinder.

After lapse of a predetermined time between time X3 and time X4 indicated in FIG. 4, the controller 15 controls the piston release control valve 61 and stops operation of the piston restraining device 31. The piston 25 is further moved, to thereby generate a suction force again in the chamber 41 formed in the cylinder 27 (a second suction stroke). During time T4 until the piston reaches the upper point, the gas suction valve 51 is controlled to be open by the gas suction valve controlling valve 55 of the electromagnetic directional control valve device 19. In this instance, due to the suction force of the chamber 41 (the second suction stroke), dry air is supplied from the gas supply device 5 to the chamber 41. Dry air is supplied through the gas suction valve 51 to the chamber 41 while being maintained at a predetermined pressure by means of the pressure control valve REG2. This gas pressure is 0 to 5 kg/cm². It should be noted that a pressure of 0 kg/cm² forms an equilibrium state under atmospheric pressure, and theoretically an expansion ratio of 200% is obtained. This is the condition of step 2 in FIG. 3. Time T4 in FIG. 4 indicates a second suction stroke. In a suction stroke, a high-viscosity material is first supplied to the cylinder 27. This is because if a gas is first supplied, the gas in the chamber 41 will expand during the suction stroke, and a suction force in the chamber 41 can therefore not be obtained when a high-viscosity material is supplied. In this case, it is required to conduct pressurization to generate a force for compressing the gas in the chamber and extrude a high-viscosity material into the chamber.

With lapse of time T5 after the gas suction valve 51 is closed, the control device 17 controls the lower-stage portion of the electromagnetic directional control valve 21 to be interposed between the air source 11 of air and the piston pump 23, to thereby allow communication between the A-port and the T1-port, and between the B-port and the P-port. Therefore, air from the air source 11 is supplied to the control chamber 43b through the P-port and the B-port, and air in the control chamber 43a is released to the atmosphere through the check valve 47, the A-port, the T1-port and the relief valve 58. Consequently, the piston 25 moves in a direction to reduce the capacity of the chamber 41 for time T6 in FIG. 4 (a pressurizing stroke), thus compressing the gas in the chamber 41.

When the piston portion 37 of the piston 25 on a side of the control chamber 43 moves to the preliminary lower point shown in FIG. 2 and FIG. 4, the controller 15 controls the piston release control valve 61 to thereby operate the piston restraining device 31, thus reliably stopping the piston portion 37 on a side of the control chamber 43 at the preliminary lower point (see X7 in FIG. 4). This is the condition of step 3 in FIG. 3. With the lapse of time T7 after the piston 25 stops at the preliminary lower point (see X8 in FIG. 4), the controller 15 of the control device 17 controls the material discharge valve controlling valve 59, to thereby open the material discharge valve 53 and move the piston 25 to the lower point. Therefore, during time T8 (during a discharge stroke), a mixture 70 of a high-viscosity material and a gas is discharged into a conduit 72 (see X8 and X9 in FIG. 4). This is the condition of step 4 in FIG. 3.

As a high-viscosity material, a one-pack type curable material or a two-pack type curable material can be used. Examples of such materials include a two-pack type curable material comprising a primary agent and a curing agent, and one-pack type curable materials such as quick-cure thermosetting urethane, moisture-setting urethane, silicone, acrylurethane, and a silyl group containing curable material, etc. Such materials can be quickly cured at room temperature or by heating, thus increasing productivity and eliminating the need for a large heating device.

The mixture of a high-viscosity material and a gas discharged to the conduit is dispersed in the premixer 7. The gas compressed in the high-viscosity material expands immediately after being discharged from the coating gun 67 to the atmosphere, and the high-viscosity material foams. Opening and closing of the coating gun 67 is controlled by the coating gun control valve 63 of the electromagnetic directional control valve device 19.

As has been described above, in the present embodiment, a suction condition is generated in the chamber 41 of the cylinder 27, and a high-viscosity material is supplied to the chamber 41 using the suction force. Therefore, it is unnecessary to use a conventional large primary pump for supplying a high-viscosity material. A high-viscosity material can be supplied directly from a small and simple container such as a cartridge. Therefore, the present invention can be applied to a foaming-in-place apparatus for coating, injecting or molding a foam having a desired form such as a compact and simple packing material, a gasket, a string-like object, and so on.

The invention claimed is:

1. A method for mixing a high-viscosity material with a gas, using a piston pump in which a piston is reciprocally moved in a cylinder to thereby effect suction and discharge, said method comprising:
a step of effecting a first suction stroke in which the piston is moved in the cylinder so as to generate a suction condition in the cylinder;
a step of supplying a high-viscosity material to the cylinder at a high-viscosity material supply pressure using a suction force in the cylinder generated in said first suction stroke, wherein the high-viscosity material supply is at a pressure of 1 to 10 kg/cm²;
a step of stopping the piston after said first suction stroke;
a step of effecting a second suction stroke in which the piston is moved in the cylinder after the supply of the high-viscosity material;
a step of supplying a gas to the cylinder at a gas supply pressure of 0 to 5 kg/cm², using a suction force in the cylinder generated in the second suction stroke;
a step of effecting a pressurizing stroke in which the piston is moved in the cylinder after completion of the supply of the gas, to thereby pressurize the high-viscosity material and the gas; and
a step of effecting a discharge stroke in which the piston is moved in the cylinder after the pressurizing stroke, to thereby discharge the high-viscosity material and the gas into a conduit.

2. A method according to claim 1, wherein:
said step of supplying the high-viscosity material is conducted in the first suction stroke or after completion of the first suction stroke; and
said step of supplying the gas is conducted in the second suction stroke or after completion of the second suction stroke.

3. A method according to claim 1, wherein:
said step of supplying the high-viscosity material and said step of supplying the gas are conducted by pressurization and extrusion, in addition to the suction force generated in the cylinder of the piston pump.

4. A method according to claim 1, wherein:
said step of stopping the piston is conducted by applying a restraining force to the piston and locking the piston.

5. A method according to claim 1, wherein:
a ratio in which the high-viscosity material is mixed with the gas is determined by controlling a pressure of the gas supplied to the cylinder of the piston pump.

6. A method according to claim 1, wherein:
a ratio in which the high-viscosity material is mixed with the gas is determined by controlling a position at which the piston is stopped in the cylinder in said step of stopping the piston.

7. A method for foaming a high-viscosity material, using a piston pump in which a piston is reciprocally moved in a cylinder to thereby effect a suction stroke and a discharge stroke, said method comprising:
supplying a high-viscosity material at a high-viscosity material supply pressure of to the cylinder in the suction stroke or after stopping the suction stroke of the piston pump, wherein the high-viscosity material supply is at a pressure of 1 to 10 kg/cm$^2$;

effecting a second suction stroke by moving the piston after the supply of the high-viscosity material;

a first step of supplying a gas into the cylinder at a gas supply pressure of 0 to 5 kg/cm$^2$ in the second suction stroke or after stopping the suction stroke of the piston pump;

a second step of pressurizing the high-viscosity material and the gas in the cylinder by effecting a discharge stroke of the piston pump, after completion of the supply of the gas;

effecting a discharge stroke in which the high-viscosity material and the gas are discharged into a conduit after the pressurization, thus discharging a mixture of the high-viscosity material and the gas dispersed therein; and foaming the mixture under atmospheric pressure.

8. A method according to claim 7, wherein:

a ratio in which the high-viscosity material is mixed with the gas is determined by controlling a pressure of the gas supplied to the cylinder of the piston pump.

9. A method according to claim 8, wherein:

in said first step, a ratio in which the high-viscosity material is mixed with the gas is determined by controlling a position at which the piston is stopped in the cylinder in the suction stroke.

\* \* \* \* \*